(12) United States Patent
He et al.

(10) Patent No.: US 8,916,066 B2
(45) Date of Patent: Dec. 23, 2014

(54) POLYMERIC FUSED THIOPHENE SEMICONDUCTOR FORMULATION

(75) Inventors: Mingqian He, Horseheads, NY (US); Jianfeng Li, Painted Post, NY (US); Jen-Chieh Lin, Zhubei (TW); James Robert Matthews, Painted Post, NY (US); Weijun Niu, Painted Post, NY (US); Michael Lesley Sorensen, Waverly, NY (US)

(73) Assignee: Corning Incorporated, Corning, NY (US)

( * ) Notice: Subject to any disclaimer, the term of this patent is extended or adjusted under 35 U.S.C. 154(b) by 724 days.

(21) Appl. No.: 13/093,279

(22) Filed: Apr. 25, 2011

(65) Prior Publication Data

US 2011/0291054 A1 Dec. 1, 2011

Related U.S. Application Data

(60) Provisional application No. 61/349,079, filed on May 27, 2010.

(51) Int. Cl.
 *H01B 1/00* (2006.01)
 *C08G 75/00* (2006.01)
 *C09D 11/36* (2014.01)
 *C08K 5/01* (2006.01)
 *C08L 65/00* (2006.01)

(52) U.S. Cl.
 CPC . *C09D 11/36* (2013.01); *C08K 5/01* (2013.01); *C08G 2261/124* (2013.01); *C08G 2261/141* (2013.01); *C08G 2261/3223* (2013.01); *C08G 2261/3243* (2013.01); *C08G 2261/92* (2013.01); *C08L 65/00* (2013.01)
 USPC .......................................... 252/500; 528/377

(58) Field of Classification Search
 None
 See application file for complete search history.

(56) References Cited

U.S. PATENT DOCUMENTS

| 4,737,557 | A | 4/1988 | Sato et al. | 526/256 |
|---|---|---|---|---|
| 5,069,823 | A | 12/1991 | Sato et al. | 252/518 |
| 5,814,376 | A | 9/1998 | Cabelli | 427/428 |
| 7,501,672 | B2 | 3/2009 | Fishburn et al. | 257/249 |
| 7,705,108 | B2 | 4/2010 | He | 528/226 |
| 8,642,719 | B2 * | 2/2014 | He et al. | 528/377 |
| 2003/0116772 | A1 | 6/2003 | Yamazaki et al. | 257/83 |
| 2004/0232385 | A1 | 11/2004 | Kram et al. | 252/301.16 |
| 2006/0008742 | A1 * | 1/2006 | Itoh et al. | 430/320 |
| 2007/0145324 | A1 | 6/2007 | Masuda | |
| 2011/0303910 | A1 * | 12/2011 | Kuwabara et al. | 257/40 |

FOREIGN PATENT DOCUMENTS

| CN | 1791656 | | 6/2006 | |
|---|---|---|---|---|
| EP | 2 169 023 | A1 | 3/2010 | |
| EP | 2169023 | | 3/2010 | |
| GB | 2466843 | A * | 7/2010 | H01L 51/00 |
| WO | 2005-111045 | A1 | 11/2005 | |
| WO | 2006/031893 | | 3/2006 | |
| WO | 2008/106019 | | 9/2008 | |
| WO | 2009/123695 | | 10/2009 | |
| WO | WO 2010098372 | A1 * | 9/2010 | C07D 495/04 |

OTHER PUBLICATIONS

Allard, et al.. "Organic Semiconductors for Solution-Processable Field-Effect Transitors (OFETS)", Agew. Chem. Int. Ed., 2008, 47, pp. 4070-4098.
Sirringhau, et al., "Two-Dimensional Charge Transport in Self-Organized, High-Mobility Conjugated Polymers", Nature, vol. 401, 1999, pp. 685.
Katz, Howard E., "Recent Advances in Semiconductor Performance and Printing Processes for Organic Transistor-Based Electronics", Chem. Mater., 2004, 16, pp. 4748-4756.
Fong, et al., "Tetrathienoacene Copolymers As High Mobility, Soluble Organic Semiconductors", J. Am. Chem. Soc., 130, 2008, pp. 13202-13203.

* cited by examiner

Primary Examiner — Harold Pyon
Assistant Examiner — Jaison Thomas
(74) Attorney, Agent, or Firm — John L. Haack

(57) ABSTRACT

A formulation including:
   an organic semiconducting material; and
   a carrier liquid including at least one of:
     a first liquid of the formulas (III) or (II):

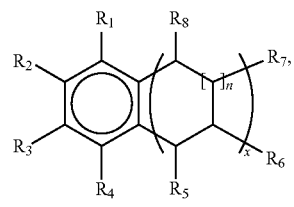

(III)

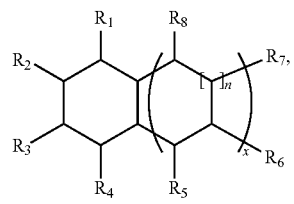

(IIa)

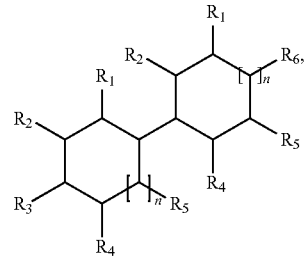

(IIb)

or mixtures of formulas (III) and (II); and
   a second liquid of a saturated or unsaturated cyclic hydrocarbylene compound of the formula (I):

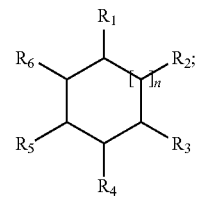

(I)

where the respective $R_{1-8}$, x, and n are as defined herein, and optionally a tertiary liquid carrier, as defined herein. Also disclosed are semiconducting articles prepared with the formulations as defined herein.

13 Claims, 6 Drawing Sheets

(IIa)

(IIb)

10

11

12

13

14

(III)

15

16

17

US 8,916,066 B2

POLYMERIC FUSED THIOPHENE SEMICONDUCTOR FORMULATION

CLAIMING BENEFIT OF PRIOR FILED U.S. APPLICATION

This application claims the benefit of U.S. Provisional Application No. 61/349,079, filed on May 27, 2010.

BACKGROUND

The disclosure generally relates to formulations including semiconducting polymers. For additional background see commonly owned and assigned, U.S. Pat. No. 7,705,108, to He, M., et al., entitled "FUSED THIOPHENES, METHODS FOR MAKING FUSED THIOPHENES, AND USES THEREOF," and U.S. patent application Ser. No. 12/781,291, to He, M., et al., entitled "METHOD OF MAKING AN ORGANIC SEMICONDUCTOR DEVICE," filed May 17, 2010.

SUMMARY

The disclosure provides formulations comprising a semiconducting polymer, which formulations are suitable for the preparation of electronic devices such as thin film transistors (TFT) and OFETs.

BRIEF DESCRIPTION OF THE DRAWING(S)

In embodiments of the disclosure:

DETAILED DESCRIPTION

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

DEFINITIONS

Figure 1:
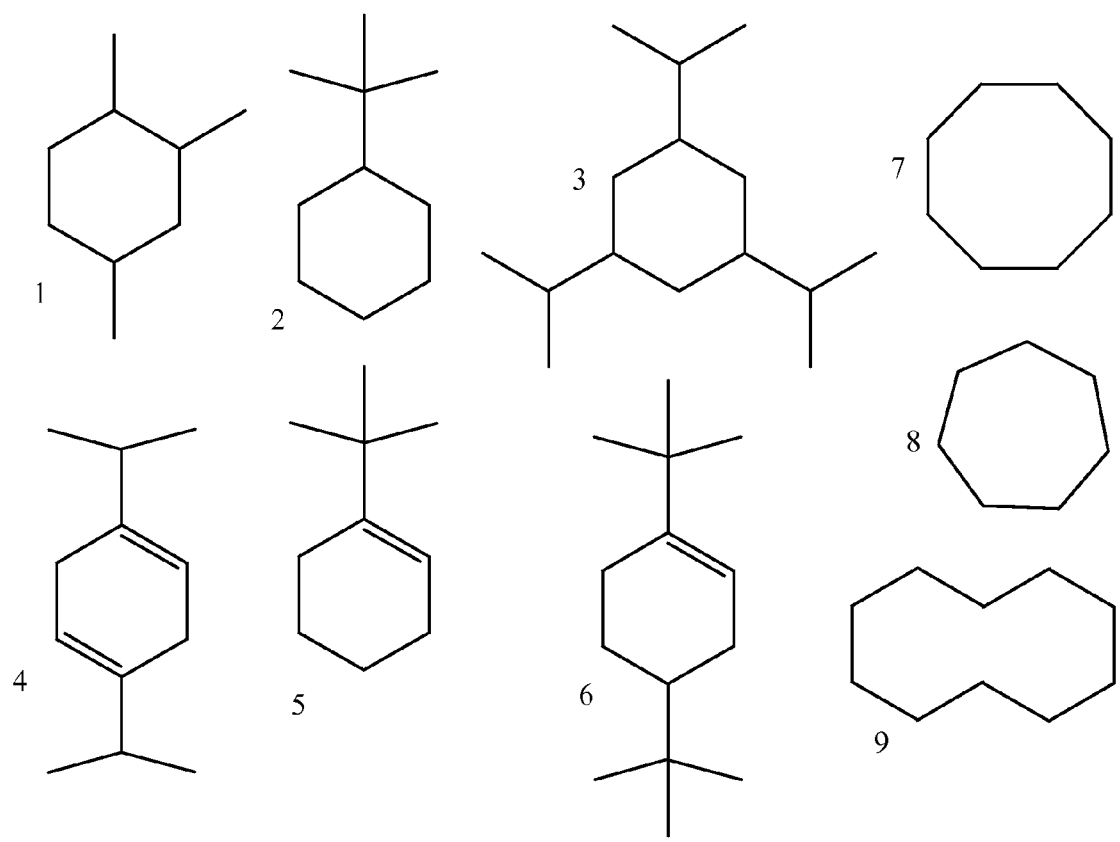
FIG. 1 shows exemplary chemical structures of carrier liquids of the formula (I) having a single alicyclic ring.
Figure 2:
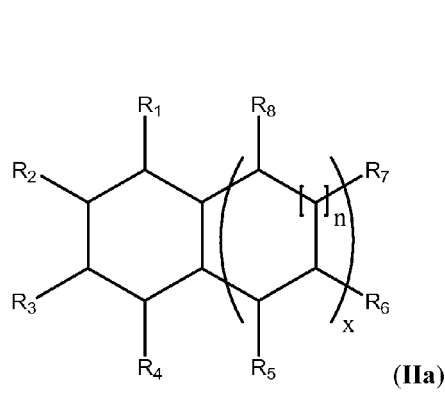
FIG. 2 shows exemplary chemical structures of liquid carriers of formulas (IIa) and (IIb) having two or more, fused or un-fused, alicyclic rings.
Figure 2:
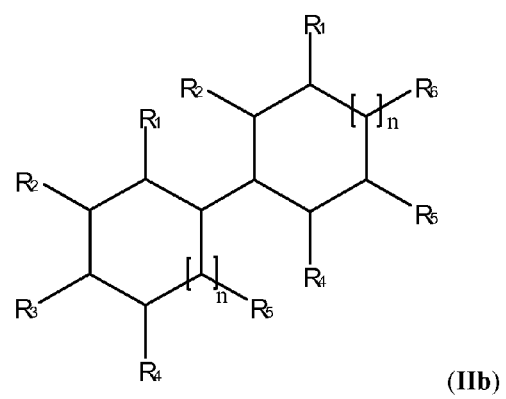
Figure 2:
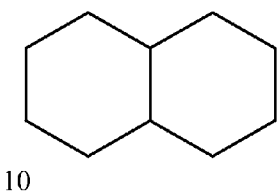
Figure 2:
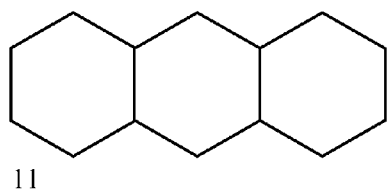
Figure 2:
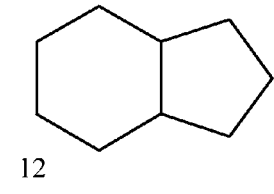
Figure 2:
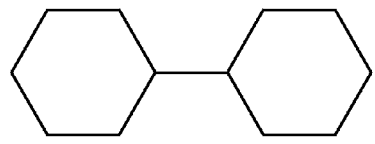
Figure 2:
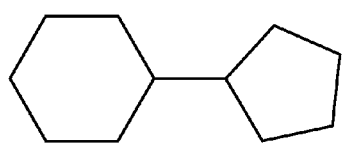
Figure 3:
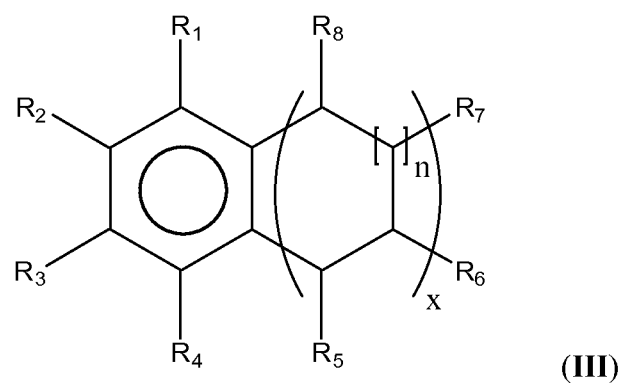
FIG. 3 shows exemplary chemical structures of liquid carriers of the formula (III) having at least one aromatic group and optionally one or more fused rings.
Figure 3:
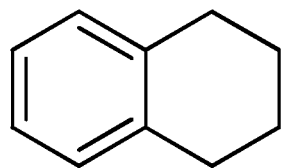
Figure 3:
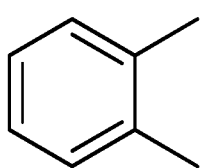
Figure 3:
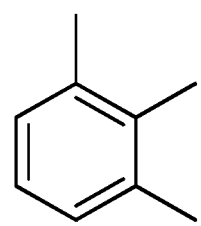

"Liquid carrier," "liquid carrier component," "liquid component," "carrier liquid," "carrier," and like terms refer one or more of the disclosed organic fluids that can be selected for use in the disclosed formulations and can include, for example, any of the specified strong solvents, intermediate-strength solvents, weak solvents, non-solvents, and mixtures thereof, or equivalents thereof, see for example FIGS. 1, 2, and 3 and the example compound structures.

"FTx" or like abbreviations can refer to a fused thiophene compound, polymerizable monomers thereof, and polymers thereof, where x is an integer indicating the number of fused thiophene ring or cycle units fused into a single core unit, for example, an FT2 has two fused rings in the core unit, an FT3 has three fused rings in the core unit, an FT4 has four fused rings in the core unit, an FT5 has five fused rings in the core unit, and like higher designations in the core unit.

"Hydrocarbon," "hydrocarbyl," "hydrocarbylene," "hydrocarbyloxy," and like terms generally refer to monovalent, such as —R, or divalent —R— moieties, and can include, for example, alkyl hydrocarbons, aromatic or aryl hydrocarbons, alkyl substituted aryl hydrocarbons, alkoxy substituted aryl hydrocarbons, heteroalkyl hydrocarbons, heteroaromatic or heteroaryl hydrocarbons, alkyl substituted heteroaryl hydrocarbons, alkoxy substituted heteroaryl hydrocarbons, and like hydrocarbon moieties, and as illustrated herein.

"Ring," "cycle," "cyclic," or like terms generally refer to at least one continuous closed loop or chain of atoms and can include, for example, saturated alicyclics, unsaturated alicyclics, aromatics, hetero-aromatics (heteroaryl), and like cyclic classifications, or combinations thereof, including monocyclic, bicyclic, tricyclic, and like conventional designations.

"Alkyl" includes linear alkyls, branched alkyls, and cycloalkyls. "Substituted alkyl" or "optionally substituted alkyl" refers to an alkyl substituent, which can include, for example, a linear alkyl, a branched alkyl, or a cycloalkyl, having from 1 to 4 optional substituents selected from, for example, hydroxyl (—OH), halogen, amino (—NH$_2$ or —NR$_2$), nitro (—NO$_2$), acyl (—C(=O)R), alkylsulfonyl (—S(=O)$_2$R), alkoxy (—OR), (C$_{3-10}$)cycloalkyl, and like substituents, where R is a hydrocarbyl, aryl, Het, or like moieties, such as a monovalent alkyl or a divalent alkylene having from 1 to about 10 carbon atoms. For example, a hydroxy substituted alkyl, can be a 2-hydroxy substituted propylene of the formula —CH$_2$—CH(OH)—CH$_2$—, an alkoxy substituted alkyl, can be a 2-methoxy substituted ethyl of the formula —CH$_2$—CH$_2$—O—CH$_3$, an amino substituted alkyl, can be a 1-dialkylamino substituted ethyl of the formula —CH(NR$_2$)—CH$_3$, an oligo-(oxyalkylene), poly-(oxyalkylene), or poly-(alkylene oxide) substituted alkyl, can be, for example, of the partial formula —(R—O)$_x$—, where x can be, for example, from 1 to about 50, and from 1 to about 20, and like substituted oxyalkylene substituents, such as of the formula —(CR$^5$—CHR$^5$—O)$_x$— where R$^5$ is hydrogen or a substituted or unsubstituted (C$_{1-8}$)hydrocarbyl such as alkyl, and x is an integer of from 1 to about 50.

"Aryl" includes a mono- or divalent-phenyl radical or an ortho-fused bicyclic carbocyclic radical having about nine to twenty ring atoms in which at least one ring is aromatic. Aryl (Ar) can include substituted aryls, such as a phenyl radical having from 1 to 5 substituents, for example, alkyl, alkoxy, halo, and like substituents.

"Het" includes a four-(4), five-(5), six-(6), or seven-(7) membered saturated or unsaturated heterocyclic ring having 1, 2, 3, or 4 heteroatoms selected from the group consisting of oxy, thio, sulfinyl, sulfonyl, selenium, tellurium, and nitrogen, which ring is optionally fused to a benzene ring. Het also includes "heteroaryl," which encompasses a radical attached via a ring carbon of a monocyclic aromatic ring containing five or six ring atoms consisting of carbon and 1, 2, 3, or 4 heteroatoms each selected from the group consisting of non-peroxide oxy, thio, and N(X) wherein X is absent or is H, O, (C$_{1-4}$)alkyl, phenyl, or benzyl, and a radical of an ortho-fused bicyclic heterocycle of about eight to ten ring atoms derived therefrom, particularly a benzo-derivative or one derived by fusing a propylene, trimethylene, or tetramethylene diradical thereto.

In embodiments, halo or halide includes fluoro, chloro, bromo, or iodo. Alkyl, alkoxy, etc., include both straight and branched groups; but reference to an individual radical such as "propyl" embraces only the straight chain radical, a branched chain isomer such as "isopropyl" being specifically referred to.

The carbon atom content of various hydrocarbon-containing (i.e., hydrocarbyl) moieties can alternatively be indicated by a prefix designating a lower and upper number of carbon atoms in the moiety, i.e., the prefix $C_{i-j}$ indicates a moiety of the integer "i" to the integer "j" carbon atoms, inclusive. Thus, for example, $(C_1-C_8)$alkyl or $C_{1-8}$alkyl refers to an alkyl of one to eight carbon atoms, inclusive, and hydrocarbyloxy such as $(C_1-C_8)$alkoxy or $C_{1-8}$alkoxy refers to an alkoxy radical (—OR) having an alkyl group of one to eight carbon atoms, inclusive.

Specifically, a $C_{1-8}$alkyl can be, for example, methyl, ethyl, propyl, isopropyl, butyl, iso-butyl, sec-butyl, tert-butyl, pentyl, 3-pentyl, hexyl, heptyl, or octyl; $(C_{3-12})$cycloalkyl can be cyclopropyl, cyclobutyl, cyclopentyl, cyclohexyl, cycloheptyl, cyclooctyl, including bicyclic, tricyclic, or multi-cyclic substituents, and like substituents.

A specific "hydrocarbyl" can be, for example, $(C_{1-10})$hydrocarbyl, including all intermediate chain lengths and values and $(C_{3-12})$cyclohydrocarbyl including all intermediate values and ring sizes.

$C_{1-8}$alkoxy can be, for example, methoxy, ethoxy, propoxy, isopropoxy, butoxy, iso-butoxy, sec-butoxy, pentoxy, 3-pentoxy, hexyloxy, 1-methylhexyloxy, heptyloxy, octyloxy, and like substituents.

A —C(=O)$(C_{3-7})$alkyl- or —$(C_{2-7})$alkanoyl can be, for example, acetyl, propanoyl, butanoyl, pentanoyl, 4-methylpentanoyl, hexanoyl, or heptanoyl. Aryl (Ar) can be, for example, phenyl, naphthyl, anthracenyl, phenanthrenyl, fluorenyl, tetrahydronaphthyl, or indanyl. Het can be, for example, pyrrolidinyl, piperidinyl, morpholinyl, thiomorpholinyl, or heteroaryl. Heteroaryl can be, for example, furyl, imidazolyl, triazolyl, triazinyl, oxazoyl, isoxazoyl, thiazolyl, isothiazoyl, pyrazolyl, pyrrolyl, pyrazinyl, tetrazolyl, pyridyl, (or its N-oxide), thienyl, pyrimidinyl (or its N-oxide), indolyl, isoquinolyl (or its N-oxide) or quinolyl (or its N-oxide).

Other conditions suitable for formation and modification of the compounds, oligomers, polymers, composites, or like products of the disclosure, from a variety of starting materials or intermediates, as disclosed and illustrated herein are available. For example, see Feiser and Feiser, "Reagents for Organic Synthesis", Vol. 1, et seq., 1967; March, J. "Advanced Organic Chemistry," John Wiley & Sons, 4$^{th}$ ed. 1992; House, H. O., "Modem Synthetic Reactions," 2$^{nd}$ ed. W. A. Benjamin, New York, 1972; and Larock, R. C., "Comprehensive Organic Transformations," 2$^{nd}$ ed., 1999, Wiley-VCH Publishers, New York. The starting materials employed in the preparative methods described herein are, for example, commercially available, have been reported in the scientific literature, or can be prepared from readily available starting materials using procedures known in the field. It may be desirable to optionally use a protecting group during all or portions of the above described or alternative preparative procedures. Such protecting groups and methods for their introduction and removal are known in the art. See Greene, T. W.; Wutz, P. G. M. "Protecting Groups In Organic Synthesis," 2$^{nd}$ ed., 1991, New York, John Wiley & Sons, Inc.

"Monomer," "mer," or like terms refer to a compound that can be (or has already been) covalently combined or linked with other monomers of like or different structure to form homogenous (homopolymers) or heterogeneous (e.g., copolymers, terpolymers, and like heteropolymers) chains of the target polymer. Suitable monomers as disclosed and illustrated herein or incorporated by reference can include, for example, low molecular weight polymerizable compounds, such as from about 50 to about 200 Daltons, and higher molecular weight compounds, such as from about 200 to about 10,000 Daltons, including unsaturated oligomeric or unsaturated polymeric compounds.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, and like values, and ranges thereof, employed in describing the embodiments of the disclosure, refers to variation in the numerical quantity that can occur, for example: through typical measuring and handling procedures used for making compounds, compositions, composites, concentrates or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture. The claims appended hereto include equivalents of these "about" quantities.

"Consisting essentially of" in embodiments refers, for example, to a formulation or composition, and articles, devices, or any apparatus of the disclosure, and can include the components or steps listed in the claim, plus other components or steps that do not materially affect the basic and novel properties of the compositions, articles, apparatus, or methods of making and use of the disclosure, such as particular reactants, particular additives or ingredients, a particular agent, a particular surface modifier or condition, or like structure, material, or process variable selected. Items that may materially affect the basic properties of the components or steps of the disclosure or that may impart undesirable characteristics to the present disclosure include, for example, no or very low first liquid compound solubility, extensive or protracted dissolution processing because of poor solubility, unnecessary exposure of the starting compounds, the polymers, or the resulting coated semiconductor articles or devices to excessively high temperatures, and like contrary steps.

The indefinite article "a" or "an" and its corresponding definite article "the" as used herein means at least one, or one or more, unless specified otherwise.

Abbreviations, which are well known to one of ordinary skill in the art, may be used (e.g., "h" or "hr" for hour or hours, "g" or "gm" for gram(s), "mL" for milliliters, and "rt" for room temperature, "nm" for nanometers, "bp" for boiling point, and like abbreviations).

Specific and preferred values disclosed for components, ingredients, additives, and like aspects, and ranges thereof, are for illustration only; they do not exclude other defined values or other values within defined ranges. The formulations, compositions, devices, apparatus, and methods of the disclosure can include any value or any combination of the values, specific values, more specific values, and preferred values described herein.

The use of organic semiconductors as functional materials has become a reality in a number of different applications for the electronics industry including, for example, printed electronics, organic transistors (OTFTs, OFETs), organic light-emitting diodes (OLEDs), organic integrated circuits, and organic solar cells, among others (see for example, Sirringhaus, H., et al., *Nature*, 1999, 401, 685; Allard, S., et al., *Angew. Chem. Int. Ed.*, 2008, 47, 4070; *Organic Field-Effect Transistors*, 1st ed., Bao, Z.; et al., CRC Press: Boca Raton, Fla., 2007). Organic transistors are widely used in, for example, smart cards, security tags, the switching elements in the backplane of flat panel displays, and like applications. Organic semiconductors can substantially reduce the cost over their inorganic counterparts such as silicon, if they can be deposited from solution. Such solvent or solution-deposition processing enables rapid, large-area fabrication routes using various print and related coating methods such as spin-coating, ink-jet printing, gravure printing, transfer printing, and like printing processes (see for example, Katz, H. E., *Chem. Mater.*, 2004, 16, 4748).

The performance of an OFET device can be evaluated by several parameters, for example: charge carrier mobility, current On/Off ratio, threshold voltage, and the magnitude of the On and Off current (see Katz, supra.). The ability to achieve high performance parameters for devices prepared from a solution-deposition process with a minimum number of processing steps is considered a strong advantage. For this reason it is desirable to prepare stable inks or liquid formulations of the organic semiconducting materials.

Recently, high performance semiconducting fused thiophene polymers have been developed at Corning, Inc., (see for example, Fong, H. H., et al., *J. Am. Chem. Soc.*, 2008, 130, 13202; He, M., et al., *J. Am. Chem. Soc.*, 2009, 131, 11930; He, M., et al., WO2009123695; He, M., WO2008106019; He, M., WO 2006 031893). Dialkylated tetrathienoacene copolymers (FT4) can be deposited from a dichlorobenzene solution to yield ordered films with a short π-π distance of about 3.76 Angstroms and with a field-effect hole mobility that exceeds 0.3 $cm^2/V\cdot s$. This polymer enables simple transistor fabrication at relatively low temperatures. This capability is particularly important for achieving large-area, mechanically flexible electronics. However, organic semiconducting materials, especially for polymeric semiconductors, generally have solubility limitations for two main reasons (see McCulloch, I., et al., U.S. Pat. No. 7,510,672). Firstly, semiconducting polymers may require a conjugated component, generally the backbone, to confer the appropriate electronic band gap. The backbone conjugation usually includes a high degree of aromatic hydrocarbon, hetero-aromatic, or heterocyclic rings. These structural aspects tend to limit the solubility in typical coating solvents. Secondly, charge transport polymers are designed to facilitate intermolecular charge hopping, which can be enhanced by close-packing and aggregation of the polymer chains. If this occurs in solutions, it may lead to filtration and coating problems.

Highly conjugated organic materials, such as monomer or polymer compositions of the present disclosure, are being developed for use in a variety of applications, including for example field effect transistors (FETs), thin-film transistors (TFTs), organic light-emitting diodes (OLEDs), electro-optic (EO) applications, as conductive materials, as two photon mixing materials, as organic semiconductors, and as non-linear optical (NLO) materials. Highly conjugated organic materials can be used, for example, in devices such as RFID tags, an electroluminescent device, such as used in a flat panel display, a photovoltaic, a sensor, and like devices, or a combination thereof.

In embodiments, the disclosure provides formulations comprising semiconducting polymers, such as Corning's FT4 and like polymers, which are suitable for the preparation of electronic devices like thin film transistors (TFT) and OFETs, in particular by, for example, spin-casting and printing processes. Compositions or formulations comprising semiconducting polymers and organic solvents have been described (see for example, U.S. Pat. Nos. 5,069,823 and 4,737,557 (Sato, M., et al.). U.S. Pat. No. 4,737,557 mentions poly-(3-alkylthiophene) (PAT) and methods of its preparation and also mention solutions of PAT in tetralin. US 2003/116772 (Yamazaki, S., et al.) discloses the fabrication of a light-emitting device from an organic light-emitting compound dissolved in a solvent by a coating method. As possible organic compounds the reference generally discloses polymers such as PT, PPV, PP or PF. U.S. Pat. No. 5,814,376 (Cabelli, et al.), discloses a gravure coating process for forming a film of an electroconductive polymer on a substrate. As possible polymers, polyacetylene, polypyrrole, PT, PAT, polyphenylene sulfide, PPV, polythienylene vinylene, polyphenylene, polyisothianaohthlene, polyazulene, polyfuran, or polyaniline are generally mentioned. However, the aforementioned documents do not mention the preparation of semiconducting inks for fused thiophene based polymers.

In embodiments, the disclosure provides a formulation including:

an organic semiconducting material; and a carrier liquid including at least one of:

a first liquid of the formula (III) or formulas (II):

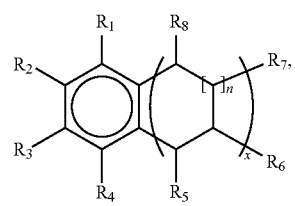

(III)

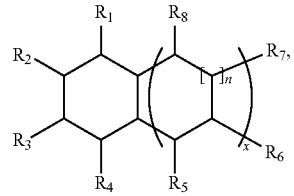

(IIa)

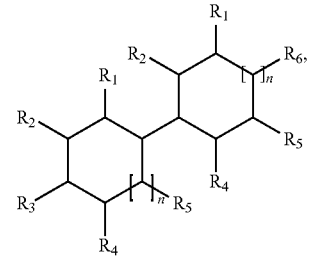

(IIb)

or mixtures of formulas (III), and (II), such as one or both of formulas (IIa) and (IIb);

a second liquid of a saturated or unsaturated cyclic hydrocarbylene compound of the formula (I):

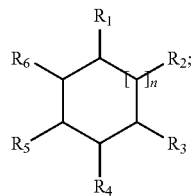

(I)

where the respective $R_{1-8}$ substituents and other structural designations in the above formulas (I) to (III) are defined herein; and optionally a tertiary liquid carrier, as defined herein.

In embodiments, the disclosure provides semiconducting articles prepared with the disclosed formulations.

In embodiments, the disclosure provides a formulation comprising:

an organic semiconducting material; and a carrier liquid comprising at least one of:

a first liquid in an amount of 50 to about 90 vol %, the first liquid being a solvent for the organic semiconducting material, the first liquid having a boiling point of at least 180° C., the first liquid having two or more rings, and at least one ring being a saturated or unsaturated cyclic hydrocarbon of the formula (IIa) or (IIb), or combinations of formulas (IIa) and (IIb):

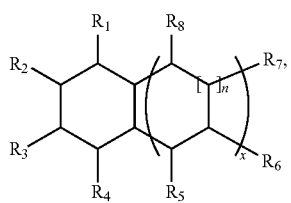

(IIa)

where each $R_{1-8}$ is independently hydrogen, a saturated or unsaturated, branched or unbranched, substituted or unsubstituted $(C_{1-10})$hydrocarbylene, a $(C_{3-10})$ cyclic hydrocarbylene, or a mixture thereof, n is from −2 to 4 and designates the fused ring size and can be, for example, −2 (a four membered ring) to 4 (a nine membered ring), and each ring can be the same or different size as any other ring in the compound, such as a 6-6 ring system, a 6-5 ring system, a 6-4 ring system, 6-5-6 ring system, a 6-6-6 ring system, a 6-4-6 ring system, a 6-7-5 ring system, a 5-6-5 ring system, and like ring systems, and x designates the number of additional rings fused to the first ring and can be for example 1 to 3, including intermediate values and ranges,

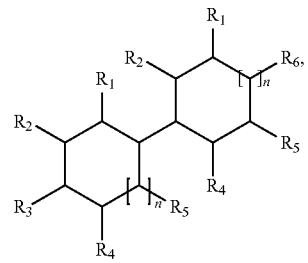

(IIb)

where each $R_{1-6}$ is independently hydrogen, a saturated or unsaturated, branched or unbranched, substituted or unsubstituted $(C_{1-10})$hydrocarbylene, a cyclic $(C_{3-10})$hydrocarbylene, or a mixture thereof, n and n' designate the respective ring sizes and can be, for example, 0 (a five membered ring) to 3 (an eight membered ring), and each ring can be the same or different size as the other ring in the compound, providing such bicyclic ring structure combinations as $C_6$—$(C_{3-7})$ or $C_5$—$(C_{3-7})$, such as $C_6$-$C_6$, $C_6$-$C_5$, $C_5$-$C_5$, $C_6$-$C_4$, and like combinations, and like ring systems, or an aromatic hydrocarbon of the formula (III):

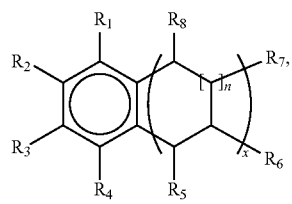

(III)

where each $R_{1-8}$ is independently hydrogen, or a saturated or unsaturated, branched or unbranched, substituted or unsubstituted monovalent $(C_{1-6})$hydrocarbylene;

n is independently selected from −1 to 6 and represents an additional portion of the fused alicyclic ring size, and each ring can be the same or different size as any other ring in the compound, such as a 6-5-6 ring system, a 6-6-6 ring system, a 6-4-6 ring system, a 6-7-5 ring system, a 6-6-5 ring system, and like ring systems;

x is from 1 to 3, such as x from 1 to 2, for example, where x is 0, 1, 2, or 3, and represents the number of additional ring fused to the first ring; and if the fused rings have a bridgehead substituent then the isomer can include cis-, trans-, or mixtures thereof, or mixtures of the formulas (II) and (III); and optionally a second liquid in an amount of, for example, from 10 to 50 vol %, from 20 to 50 vol %, from 10 to 45 vol %, from 15 to 45 vol %, from 15 to 40 vol %, and from 20 to 40 vol %, including intermediate values and ranges, of a saturated or unsaturated monocyclic hydrocarbylene compound of the formula (I):

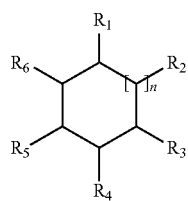 (I)

where
each $R_{1-6}$ is independently hydrogen, a saturated or unsaturated, branched or unbranched, substituted or unsubstituted $(C_{1-15})$hydrocarbylene, a carbonyl (C=O), or a mixture thereof,
n is independently selected from −1 to 6 and represents the additional portion of the saturated or unsaturated ring size, such as cycles having from 5 to about 11 carbon atoms, and any unspecified hydrogen substituent can be selected from cis-, trans-, or mixtures thereof.

The second liquid of the formula (I) can have a boiling point less than about 160° C., such as about 155° C., about 150° C., about 140° C., about 130° C., and about 120° C., including intermediate values and ranges. The second liquid of the formula (I) can have zero, one, or two un-saturations in the core ring. The second liquid of the formula (I) can have one or more compounds of a saturated, mono-unsaturated, or di-unsaturated core ring or a mixture thereof.

In a specific example, the formulation of the organic semiconducting material includes a polymer of a fused thiophene, such as having an FT2 to FT5 core, or mixtures thereof.

In embodiments, the first liquid can be, for example, a saturated fused bicyclic hydrocarbylene of the formulas (II), an aromatic fused bicyclic hydrocarbylene of the formula (III), or a combination thereof. Specific examples of the first liquid can be decalin, tetralin, or a mixture thereof. A specific example of the first liquid is of the formula (IN) bi(cyclohexane) present in an amount of 50 to 99 vol %.

In embodiments, a formulation including a compound of the formula (IIb) can include at least one $R_{1-8}$ having a saturated or unsaturated, branched or unbranched, substituted or unsubstituted $(C_{1-10})$hydrocarbylene that can be further substituted with a saturated or unsaturated cyclic $(C_{3-10})$hydrocarbylene. For example, a cyclohexane core having a linear or branched aliphatic substituent, such as a divalent $(C_{1-5})$hydrocarbylene substituent, can be situated between a second cyclohexyl substituent. Thus, compounds of the formula (IIb) can include substituents having an aliphatic substituent that is further substituted with a cyclic substituent, such as an —$C_3H_6$-(cyclohexyl), —$C_4H_8$-(cyclohexenyl), —$C_6H_{12}$-(cyclopentyl), and like monovalent-hydrocarbylene-cyclohydrocarbyl substituents.

In embodiments, the compound of the formula (III) can include an aromatic ring being fused to a second ring, and a third ring being fused to the second ring, and where the size of each ring is the same or different size as any of the other rings.

In embodiments, the second liquid can be, for example, a saturated or unsaturated single ring cyclic hydrocarbylene compound of the formula (I) such as compounds 1 to 9 shown in FIG. 1.

In embodiments, the second liquid of formula (I) can be, for example, a compound having at least one oxy substituent (=O), and can be present in the formulation, for example, in an amount of from 10 to 40 vol % of the total formulation.

In embodiments, the second liquid of formula (I) can be, for example, a saturated alicyclic hydrocarbon selected from cyclohexanone, methylcyclohexane, cyclohexane, cyclo-octane, or a mixture thereof.

In embodiments, the disclosed formulations can further comprise, for example, a third liquid in an amount of 1 to 40 vol % of the total formulation, comprising:
an alcohol of the formula ROH where R is selected from the group:
 i. an alicyclic hydrocarbon having, for example, from about 5 to about 20 carbon atoms;
 ii. an aromatic hydrocarbon having, for example, from about 6 to about 20 carbon atoms; and
 iii. a linear or branched $C_{10}$-$C_{20}$ hydrocarbon, or a mixture thereof.

In embodiments, the third liquid alcohol component or tertiary liquid, such as the accompanying alicyclic or aromatic alcohol compounds, and like compounds, or mixtures thereof, can function primarily as a viscosity modifier. Specific examples of the third liquid include, for example, at least one of the illustrated compounds of cyclohexanol, an isomer of dimethylphenol such as 2,4-xylenol, decalin-2-ol, or a mixture thereof

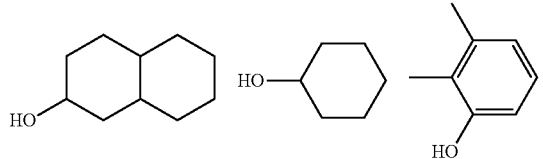

In embodiments, the disclosure provides an ink formulation comprising, for example:
about 50 to about 90 vol % of a first liquid carrier comprising at least one of the compounds of the formula (III) or of the formula (II), or a mixture of compounds of the formula (III) and formula (II);
about 10 to about 20 vol % a second liquid carrier comprising a compound of the formula (I); and
an organic semiconducting polymer.

In a specific example of the above ink formulation, as a spin-coating ink formulation, the first liquid carrier can be a mixture of decalin as a mixture of isomers and bi(cyclohexane), the second liquid carrier can be cyclohexanone, and the organic semiconducting polymer can be a polymer of a fused thiophene.

In embodiments, the disclosure provides an ink formulation including:
about 50 to about 90 vol % of a first liquid carrier of one or more compounds of the formulas (II);
about 10 to about 20 vol % a third liquid carrier comprising an alicyclic alcohol; and
an organic semiconducting polymer.

In embodiments this ink or other ink formulations can be free of compounds of the formula (III).

In a specific example of the above ink formulation, as a an ink-jet formulation, the first liquid carrier can be bi(cyclohexane), the third liquid carrier can be decalin-2-ol, and the organic semiconducting polymer can be a polymer of a fused thiophene.

In embodiments, the disclosure provides coating formulations including organic semiconductor molecules such as the above mentioned semiconductor molecules, for example, fused thiophene polymers, such as the dialkylated tetrathienoacene (FT4) copolymers.

In embodiments, the disclosure provides the use of the disclosed formulations in electronics processing and manufacture. The disclosure also includes the use of particular solvents, and classes of solvents for the dissolution and formulation of fused thiophene polymer semi-conductor materials.

In embodiments, the disclosure also relates to the use of the aforementioned polymer compounds to formulate, or as part of a formulation, for semiconductor inks. These inks can be used, for example, for drop-casting, spin-casting, spin-coating, slot-die, and like deposition methods, of the semiconductor formulation to form semiconductor layers in the manufacture of semiconducting devices. These inks may also be used for printing, by various methods including ink-jet printing, gravure, or like printing methods, of semiconductor layers in the manufacture of semi-conducting devices, such as thin film transistor (TFT) devices.

In embodiments, the disclosure provides formulations including inks having improved properties, such as solutions that do not have the shortcomings of semiconducting materials of the prior art, and that are suitable for preparation of electronics and electro-optic devices by solution processing. The disclosed formulations and methods are economical, effective, and environmentally friendly, and are especially suitable for large scale industrial production.

Advantages of using the disclosed formulations include, for example: greater solubility of certain fused thiophene (FT) based polymers in the disclosed solvents (the improved solubility provides simplified processing, superior device performance through improved reproducibility and reduced defects) compared to previously described formulations; improved ink formulation shelf-life as measured by delayed appearance or inhibited precipitation formation; and lower environmental impact of the formulation components such as free of halogenated solvents and lower potential adverse health effects from the formulation components compared to previously described chlorinated solvent formulations.

Liquid carriers, liquid vehicles, or solvents, used to process organic semiconducting materials during the fabrication of various electronic devices often have a number of performance criteria and metrics. First, the organic semiconducting material should have at least some solubility in a given volume of a particular solvent. The material can be initially dissolved in the solvent at an elevated temperature, but they generally should remain dissolved in the solvent as the temperature is lowered to typical device fabrication temperatures; generally room temperature. In addition, depending on the particular device fabrication method selected, e.g., spin-casting or ink-jet printing, other properties of the organic semiconductor solution, which can depend on the solvent system selected, may be significant. For example, the viscosity, surface tension of the solution, or both, may be adjusted to further minimize processing, or the rate at which the solvent (or combination of solvents) evaporates from the processed solution (which can depend on the vapor pressure and boiling point of solvent(s)). Also, the environmental impact and safe handling aspects of the solvent(s) selected, both in handling of solutions during processing and in solvent evaporation, can be a significant consideration.

Liquid Carriers

Certain FT4 polymer semi-conductor materials and liquid carrier combinations are disclosed that provide formulations having improved solubility and processability. The disclosed liquid carrier compounds also have a lower environmental impact than solvents previously selected for this type of polymer. Examples of solvents previously used include non-aromatic halogenated solvents, such as pentachloroethane, 1,2-dichloro-2-methylpropane, and tetrachloroethane; or halogenated aromatic solvents, such as 1,2-dichlorobenzene, 2-chlorotoluene, 3-chlorotoluene, 2-fluorotoluene, 4-fluorotoluene, 2-chlorobenzotrifluoride.

In embodiments, the liquid carriers useful in the disclosed formulations can include one or more of the following compound categories:

A. Non-aromatic cyclic hydrocarbons Non-aromatic cyclic hydrocarbons can include, for example, saturated and unsaturated compounds. These can include: a single ring containing compound, such as shown generally and with exemplary examples in FIG. 1 of the formula (I), or a compound containing two or more rings, such as shown generally and with exemplary examples such as compounds 10 to 14 shown in FIG. 2 of the formulas (II), i.e., (IIa and IIb). The compounds having two or more rings (multiple rings) can include, for example, fused ring systems or systems having rings connected by a single bond or a divalent hydrocarbylene linker.

B. Aromatic Hydrocarbons. Examples aromatic hydrocarbons of the formula (III) such as shown generally and with exemplary examples such as compounds 15 to 17 in FIG. 3 can include, for example: 1,2,3,4-tetrahydronaphthalene (tetralin), (o-, m-, p-) xylenes, 1,2,3-trimethylbenzene, 1,2,3-triethylbenzene, tert-butyl benzene, and like compounds, or combinations thereof.

C. Tertiary Liquid Carriers Examples of such tertiary liquid carriers include, for example: cyclohexanol, dimethylphenols, 1,2,4,5-tetramethylbenzene, decalin-2-ol, and like substances, or combinations thereof.

Single liquid compounds or combinations of two or more liquid compounds from the same category (A or B) or liquid combinations from among or between the categories (e.g., A, B, and C, and like combinations) can be used. As mentioned above, processing requirements can place additional limitations on which liquid carrier components can be selected and which are effective in practice (e.g., liquid at room temperature, viscosity, surface tension, and vapor pressure or boiling point). Combinations of liquid carrier components can be used to adjust organic semiconductor solution viscosity, surface tension, and vapor pressure or boiling point to suit the particular device fabrication method selected. In addition, solution compositions can be adjusted by the addition of small amounts, such as from about 1 vol % or about 1 wt % up to about 30 vol % or about 30 wt %, of one or more organic liquids as a tertiary liquid carrier so that the desired surface tension and viscosity can be achieved. Specific examples of representative and readily available commercial compounds of the liquid carrier categories A, B, and C above that are particularly useful in the disclosed formulations, along with values for some of their significant properties, are provided in Table 1. Table 4 provides a listing of additional physical properties for selected liquid carrier materials of the disclosure.

TABLE 1

Exemplary liquid carrier components and representative physical properties.

| Category | Sub-category | Examples[2] | Boiling Point (° C.) | Vapor pressure (mmHg; @ temp) | Viscosity |
|---|---|---|---|---|---|
| A. Non-aromatic cyclic hydrocarbons | single ring compounds (I)[1] | 1,2,4-Trimethylcyclohexane (undefined isomeric mixture)(1) | 141-143 | not measured | 1.02 (20° C.) |
|  | Multi-ring compounds (II)[1] | Decahydronaphthalene, mixture of cis +trans (decalin) (10) | 189-191 | 741 (188° C.) | 2.13 (20° C.) |
| B. Aromatic Hydrocarbons (III)[1] |  | 1,2,3,4-Tetrahydronaphthalene (tetralin) (15) | 207 | 0.18 (20° C.) | 2.0 (25° C.) |
|  |  | o-Xylene (16) | 143-145 | 16 (37.7° C.) 7 (20° C.) | 0.81 (20° C.) |
|  |  | 1,2,3-Trimethylbenzene (17) | 175-176 | 3.4 (37.7° C.) | 0.75 (20° C.) |

[1]General structural formula identification.
[2]See FIGS. 1 and 2 for indicated structures in parenthesis.

Spin Coat Formulations

In embodiments the disclosure provides liquid formulations for spin coat application including:

a first carrier liquid having a good solvent or dissolution property with respect to the organic semiconducting polymer, for example: a saturated or partially unsaturated hydrocarbon with one or more rings having a by of greater than about 180° C., such as 60 vol % decalin, bi(cyclohexane), a methyl decalin, or tetralin; and a second carrier liquid having a weak-dissolution or non-solvent property with respect to the organic semiconducting polymer, for example: about 40 vol % of a saturated cyclic hydrocarbon or saturated cyclic ketone having a by less than about 160° C., such as for example 120° C., such as cyclohexanone, methylcyclohexane, cyclohexane, and like liquid compounds. When decalin is selected as the first carrier liquid, the cis/trans ratio can be adjusted so that wt % cis-decalin is less than about 15.

Ink-Jet Ink Formulations

In embodiments the disclosure provides liquid formulations for ink jet ink application, including:

as with spin coat formulations above, a first carrier liquid having a good solvent or dissolution property with respect to the organic semiconducting polymer, for example: a saturated or partially unsaturated cyclic hydrocarbon or aromatic hydrocarbon with one or more rings having a by of greater than about 180° C., such as 60 vol % decalin, bi(cyclohexane), a methyl decalin, or tetralin;

an optional non-solvent component second carrier liquid having a weak-dissolution or non-solvent property with respect to the organic semiconducting polymer, for example, about 40 vol % of a saturated cyclic hydrocarbon or a saturated cyclic ketone having a by less than about 120° C., such as cyclohexanone, methylcyclohexane, cyclohexane, and like liquid compounds; and a viscosity modifying third liquid carrier component generally, for example, an alicyclic hydrocarbon or an aromatic hydrocarbon with hydroxyl functionality and a by of greater than about 180° C. and in an amount of from 5 vol % to about 40 vol %, such as decalin-2-ol, cyclohexanol, 2,4-xylenol, and like compounds.

EXAMPLES

The following examples serve to more fully describe the manner of using the above-described disclosure, and to further set forth the best modes contemplated for carrying out various aspects of the disclosure. It is understood that these examples do not limit the scope of this disclosure, but rather are presented for illustrative purposes. The working examples further describe how to prepare the formulations of the disclosure.

Example 1

Solution Preparation

A solution of P2TDC17FT4 co-polymer of the formula:

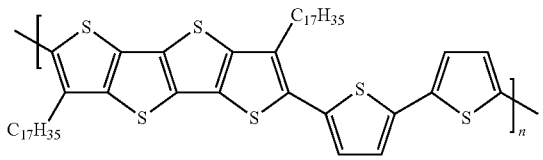

in mixed solvents was prepared by heating a specified ratio of polymer and solvent (from about 1 mg/mL to 5 mg/mL or more) to close to the boiling point of the chosen solvent for 30 min, and with optional stirring to accelerate dissolution. The polymers were completely dissolved in the solvent before the solution was cooled to room temperature. After cooling, the polymer solution was filtered by a syringe filter with 0.45 micrometer PTFE membrane.

Example 2

Ink Preparation

Using the polymer formulations of Example 1, the surface tensions were measured using a Ramé-Hart (Mountain Lakes, N.J.) NRL C.A. goniometer (Model #100-00). The sample was dispensed using the automated dispensing system from a disposable pipette tip, 1 microL at a time, until a drop was suspended from the pipette tip (approximately 7 microL). The drop image was captured and analyzed using the DROPimage software package. Viscosity measurements were obtained using a rate sweep from 1 to 1000/sec with the 50 mm parallel plates at a gap of 0.3 mm. Formulation compositions were adjusted by the addition of one or more organic liquids (i.e., a tertiary liquid carrier), so that the desired surface tension and viscosity were achieved. An example of a tertiary liquid carrier modification of a decalin solution is the addition of 2,4-xylenol.

Figure 4:
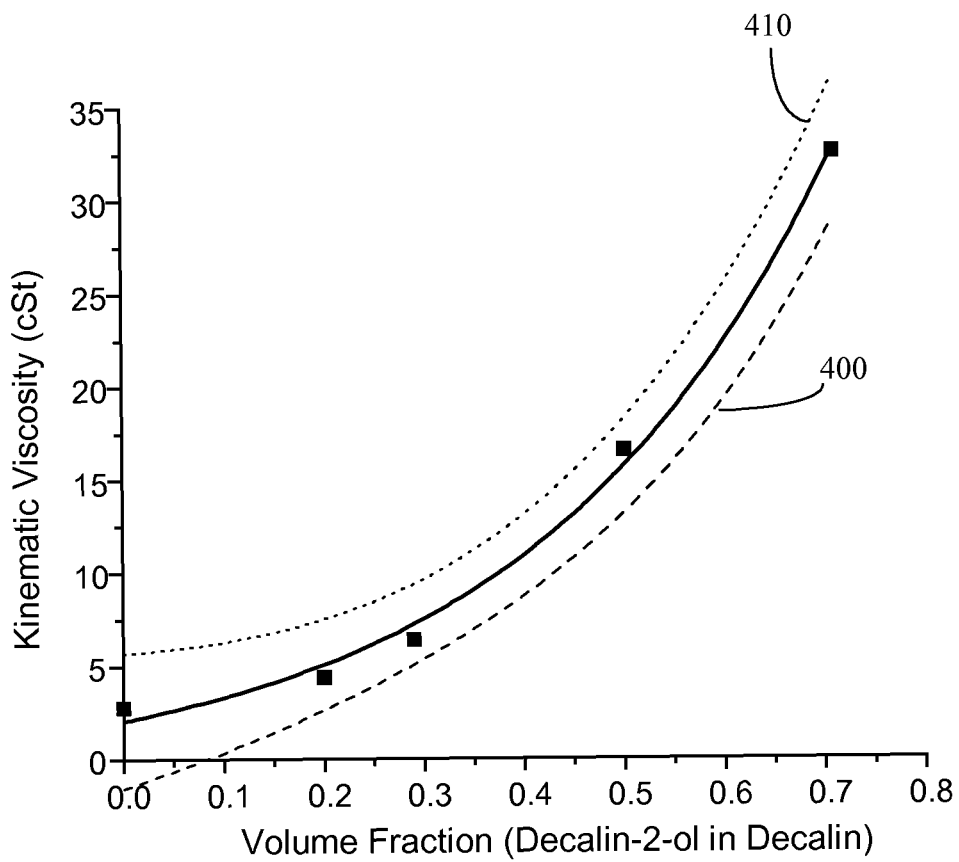
FIG. 4 shows a graph of the kinematic viscosity v. volume fraction of decalin-2-ol in decalin liquid carrier combination.
Figure 5:
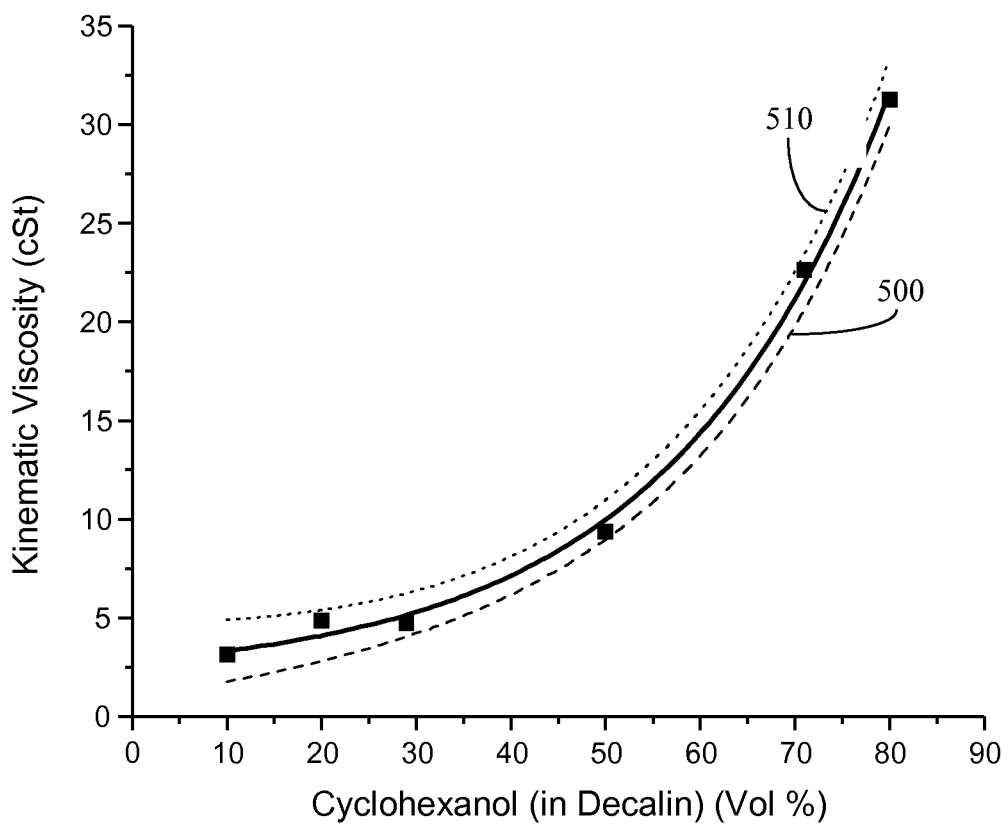
FIG. 5 shows a graph of the kinematic viscosity v. volume fraction of cyclohexanol in decalin liquid carrier combination.

FIGS. 4 and 5 show graphs of the kinematic viscosity v. volume fraction of exemplary formulations having a decalin-2-ol in decalin liquid carrier combination, and a decalin-2-ol in decalin liquid carrier combination, respectively. LCL 95% (400) (500) represents the lower confidence limit of kinematic viscosity and UCL 95% (410) (510) represents the upper 95% confidence limit of kinematic viscosity at 23° C. The line fitting details for the graphed data in FIG. 4 (decalin-2-ol in decalin) and FIG. 5 (cyclohexanol in decalin) are presented in Tables 2 and 3, respectively.

TABLE 2

Line fit for decalin-2-ol in decalin of FIG. 4.

| Equation | $y = A_1 * \exp(-x/t_1) + y_0$ | |
|---|---|---|
| R-square | 0.99212 | |
| | Value | Standard Error |
| $y_0$ | −1.10431 | 2.20677 |
| $A_1$ | 3.14429 | 1.41209 |
| $t_1$ | −0.9859 | 0.04988 |

TABLE 3

Line fit for cyclohexanol in decalin of FIG. 5.

| Equation | $y = A_1 * \exp(-x/t_1) + y_0$ | |
|---|---|---|
| R-square | 0.9959 | |
| | Value | Standard Error |
| $y_0$ | 1.91127 | 0.90273 |
| $A_1$ | 0.91592 | 0.35145 |
| $t_1$ | −23.00479 | 2.42812 |

Figure 6:
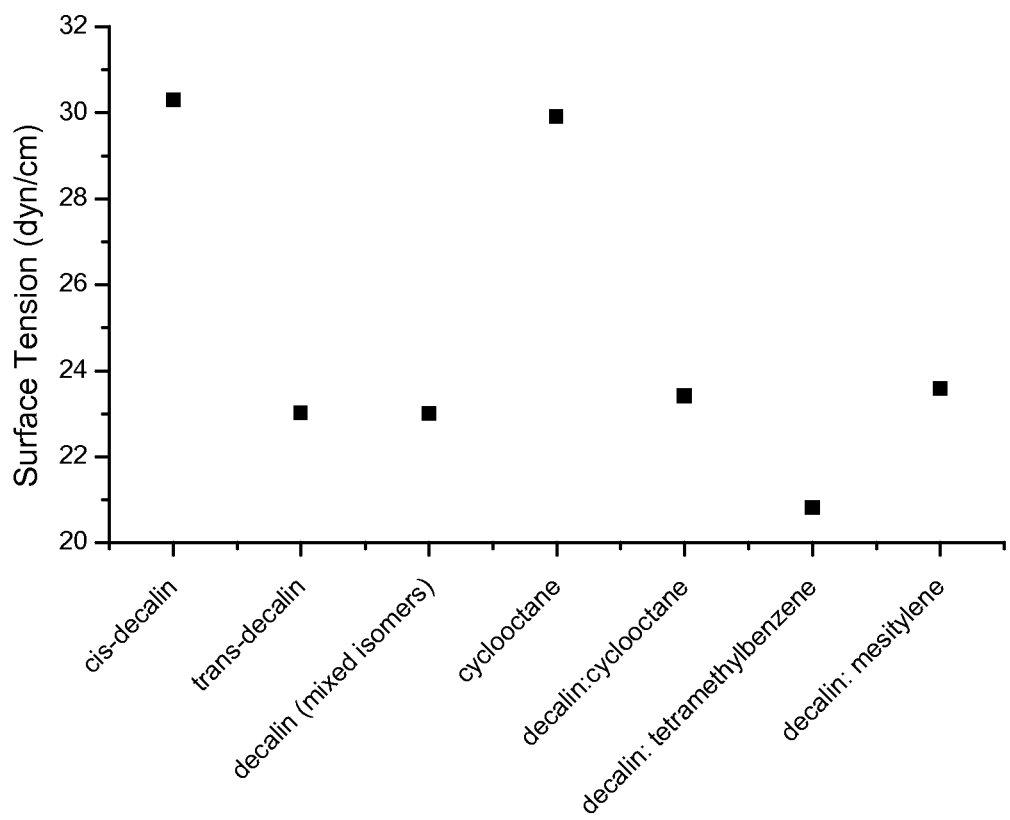
FIG. 6 shows surface tension measurements for selected liquid carriers and liquid carrier mixtures.

FIG. 6 shows surface tension measurements for selected liquid carriers and liquid carrier mixtures. The measurements demonstrate that selected liquid mixtures may not dilute or scale linearly. Surface tension is a useful property to consider in formulating the disclosed formulations and in their use as specialty coatings. In spin-coat formulation applications it is desirable to match or approximate the substrate surface energy of substrate and coating composition to facilitate wetting and avoiding drop fly-off. In ink jet formulation printing applications drop surface tensions that are too low can create droplet satellites or tails that can cause printed image and device defects.

Example 3

Thin Film Transistor Fabrication

Top-contact bottom-gate transistors using, for example, a fused thiophene copolymer, P2TDC17FT4, as the organic semiconducting channel were fabricated. Heavily doped Si<100> wafers were used as gate electrodes with a 300 nm thermally grown silicon dioxide as the gate dielectric. The substrates were cleaned by sonication in semiconductor grade acetone and isopropanol for 10 min in each solvent, and then given a 15 min air plasma treatment. Cleaned Si/SiO$_2$ samples were baked at about 200° C. for 15 min in a nitrogen atmosphere to achieve dehydration. Hexamethyl disilazane (HMDS) was used for surface modification of the gate dielectric layer. Polymer films were then deposited by spin-coating at 1,500 RPM for 40 seconds. The films were baked at 120° C. in a vacuum chamber to remove the solvent prior to thermal evaporation of top contact electrodes. 50 nm gold contacts for source and drain electrodes were vacuum-deposited at a rate of 2.5 Å/s through a metal shadow mask that defined a series of transistor devices with a channel length (L) of 80 micrometers and a channel width of 0.95 mm. Polymeric transistors were characterized using a Cascade Microtech Model 12000 series probe station and Keithley 4200-SCS Semiconductor Characterization System.

Example 4

Tetralin Device Fabrication

A thin film device was fabricated according to Example 3 using tetralin as the sole liquid carrier in the coating formulation. The transfer curve of the tetralin formulated OFET device revealed a field-effect hole mobility of 0.08 cm$^2$/V·s, an on/off ratio of 5×10$^5$, and a threshold voltage of −7 V.

Example 5

Xylene Device Fabrication
A thin film device was fabricated according to Example 3 using o-xylene as the sole liquid carrier component in the coating formulation. The transfer curve of the o-xylene formulated OFET device revealed a field-effect hole mobility of 0.06 cm$^2$/V·s, an on/off ratio of 10$^5$ to 10$^6$, and a threshold voltage of −5 V.

Example 6

Spin Coating Formulations

A 3 mg/mL formulation for spin coating included: 20 mL decalin (as a mixture of isomers); 30 mL cyclohexanone; 50 mL bi(cyclohexane) (i.e., 1-cyclohexyl-cyclohexane); and 0.3 g of an organic semiconducting polymer.

The polymer was dissolved in the decalin/bi(cyclohexane), or only in the bi(cyclohexane). When the dissolution was complete the cyclohexanone or cyclohexanone/decalin liquids were added and the solution mixed further.

An alternative spin coating formulation included, for example: 60 mL bi(cyclohexane); 40 mL cyclohexane; and 0.3 g of an organic semiconducting polymer.

The polymer was dissolved in the bi(cyclohexane) and then the cyclohexane was added.

Example 7

Inkjet Printing Formulations

A 3 mg/mL formulation for inkjet printing included: 90 mL bi(cyclohexane); 10 mL decalin-2-ol; and 0.3 g of an organic semiconducting polymer. The polymer was dissolved in the bi(cyclohexane) and then the decalin-2-ol was added.

An alternative inkjet printing formulation included, for example: 20 mL decalin; 60 mL bi(cyclohexane); 20 mL decalin-2-ol; and 0.3 g of an organic semiconducting polymer. The polymer was dissolved in the decalin and bi(cyclohexane), or only in the bi(cyclohexane). Then the decalin-2-ol or a decalin-2-ol and decalin mixture was added.

Another alternative inkjet printing formulation included, for example: 20 mL decalin; 20 mL cyclohexanol; 60 ml bi(cyclohexane); and 0.3 g of an organic semiconducting polymer. The polymer was dissolved in the decalin and bi(cyclohexane), or only in the bi(cyclohexane). Then the cyclohexanol was added or a mixture of cyclohexanol and decalin was added.

The disclosure has been described with reference to various specific embodiments and techniques. However, it should

TABLE 4

| Liquid Carrier | Category | Boiling Point (° C.) | Melt Point (° C.) | Flash Point (° C.) | Vapor P mm Hg (@° C.) | viscosity cP (@° C.) |
|---|---|---|---|---|---|---|
| Decalin (cis- and trans- mix) | A | 189-191 | −125 | 57 | 42 (@92) | 2.02-2.79 (@RT) |
| Decalin (cis-) | A | 193 | −43 | 58 | 42 (@92) | 2.02-2.79 (@RT) |
| Decalin (trans-) | A | 185 | −30 | 58 | 42 (@92) | 2.02-2.79 (@RT) |
| bi(cyclohexane) | A | 227 | 3 | 92 | — | 4.35 (@RT) |
| 1-Methyldecalin | A | 200 | −43 | — | — | — |
| Tetralin | B | 206 | −25 | — | — | 2.14 (@RT) |
| Cyclohexane | A | 80.7 | 4-7 | −18 | 77 (@20) | 0.93 cP (@22) |
| Cyclohexanone | A | 155 | −47 | 44 | 3.4 (@20) | 2.8 cP (@25) |
| Methylcyclohexane | A | 101 | −12.6 | −4 | 37 (@20) | 0.78 cP (@15) |
| Decalin-2-ol | C | 109 (@14 mm Hg) | — | 113 | — | >99 (@RT) |
| Cyclohexanol | C | 161 | 25.15 | — | 0.98 (@25) | 41.07 (@30) |
| 2,4-Xylenol | C | 211 | 22 | — | 0.1 (@25) | — |

| Liquid Carrier | surface tension (@° C.) | log P[1] Knovel | log P[1] WO2009109273 | log P[1] ChemDraw |
|---|---|---|---|---|
| Decalin (cis- and trans- mix) | 29.38 (@25) | 4.2 | 4.786 | 3.5 |
| Decalin (cis-) | 31.66 (@25) | 4.2 | — | 3.5 |
| Decalin (trans-) | 23.01 | 4.2 | — | 3.5 |
| bi(cyclohexane) | 32.17 (@25) | 5.86 | — | 4.33 |
| 1-Methyldecalin | 33.42 (@25) | — | — | 3.83 |
| Tetralin | 33.16 (@25) | — | — | — |
| Cyclohexane | 25.3 (@20) | 3.44 | — | 2.5 |
| Cyclohexanone | 34.4 (@25) | 0.81 | — | — |
| Methylcyclohexane | 23.30 (@25) | 3.61 | — | 2.83 |
| Decalin-2-ol | — | — | 2.699 | 2.27 |
| Cyclohexanol | — | 1.23 | — | — |
| 2,4-Xylenol | — | — | — | — | log P is the partition coefficient or the ratio of the concentrations of a compound in the two phases of a mixture of two immiscible solvents at equilibrium, more specifically: log P Knovel is a value obtained from Knovel search literature sources; log P WO2009109273 is a value obtained from the indicated PCT patent document; and log P ChemDraw is a value calculated using commercially available ChemDraw software.

What is claimed is:

1. A formulation comprising:
an organic semiconducting material, wherein the organic semiconducting material is a polymer of a fused thiophene; and
a carrier liquid comprising:
a first liquid in an amount of 50 to about 90 vol %, the first liquid being a solvent for the organic semiconducting material, the first liquid having a boiling point of at least 180° C., the first liquid being selected from the formulas (III), (II), or mixtures thereof:

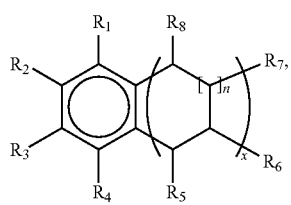

(III)

where
each $R_{1-8}$ is independently hydrogen, or a saturated or unsaturated, branched or unbranched, substituted or unsubstituted monovalent ($C_{1-6}$)hydrocarbylene;
n is independently selected from −1 to 6 and represents a portion of the fused ring size,
x is from 0 to 3, and represents the number of rings fused to the first ring;
formula (II) comprises formulas (IIa), (IIb), or mixtures thereof:

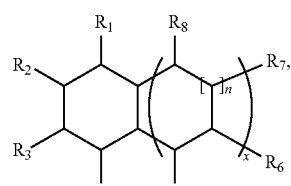

(IIa)

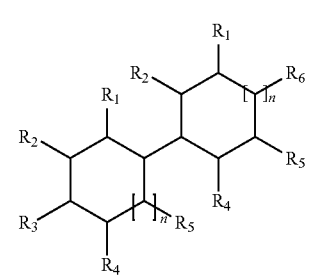

(IIb)

where
each $R_{1-8}$ is independently hydrogen, a saturated or unsaturated, branched or unbranched, substituted or unsubstituted $(C_{3-10})$hydrocarbylene, a cyclic $(C_{3-10})$hydrocarbylene, or a mixture thereof, n and n' is independently selected from −1 to 6 and represents a portion of the ring size, x is from 0 to 3, and represents the number of additional rings fused to the first ring, and if a fused ring has a bridgehead substituent then the isomer comprises cis-, trans-, or mixtures thereof; and a second liquid in an amount of from 10 to 50 vol % of a saturated or unsaturated cyclic hydrocarbylene compound of the formula (I):

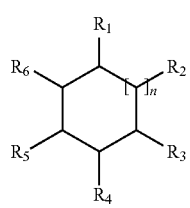

where
each $R_{1-6}$ is independently hydrogen, a saturated or unsaturated, branched or unbranched, substituted or unsubstituted $(C_{1-15})$hydrocarbylene, a carbonyl (C=O), or a mixture thereof, n is independently selected from 0 to 6 and represents a portion of the saturated or unsaturated ring size, and any unspecified hydrogen substituent is selected from cis-, trans-, or mixtures thereof, the second liquid having a boiling point less than 160° C.

2. The formulation of claim 1, wherein the first liquid comprises a saturated fused bicyclic hydrocarbylene.

3. The formulation of claim 1, wherein the first liquid comprises decalin, tetralin, or a mixture thereof.

4. The formulation of claim 1, wherein the second liquid comprises a saturated or unsaturated single ring hydrocarbylene compound.

5. The formulation of claim 1, wherein the first liquid is of the formula (IIb) and comprises bi(cyclohexane) in an amount of 50 to 90 vol %.

6. The formulation of claim 1, wherein the second liquid of formula (I) comprises a compound having at least one oxy substituent (=O), and is present in an amount of 20 to 40 vol % of the total formulation.

7. The formulation of claim 1, wherein the second liquid of formula (I) comprises a saturated alicyclic hydrocarbon selected from cyclohexanone, methylcyclohexane, cyclohexane, cyclo-octane, or a mixture thereof.

8. The formulation of claim 1, further comprising the carrier liquid having a third liquid in an amount of 1 to 40 vol % of the total formulation, comprising:
an alcohol of the formula ROH where R is selected from the group:
an alicyclic hydrocarbon;
an aromatic hydrocarbon; and
a linear or branched $C_{10}$-$C_{20}$ hydrocarbon,
or a mixture thereof.

9. The formulation of claim 8, wherein the third liquid comprises at least one of cyclohexanol, an isomer of dimethylphenol, decalin-2-ol, 2,4-xylenol, or a mixture thereof.

10. The formulation of claim 1, wherein the compound of the formula (IIb) comprises at least one $R_{1-6}$ having a saturated or unsaturated, branched or unbranched, substituted or unsubstituted $(C_{1-10})$hydrocarbylene further substituted with a saturated or unsaturated cyclic $(C_{3-10})$hydrocarbylene.

11. The formulation of claim 1, wherein the compound of the formula (III) comprises the aromatic ring being fused to a second ring, and a third ring being fused to the second ring, and where the size of each ring is the same or different size as any of the other rings.

12. A formulation comprising:
about 50 to about 90 vol % of a first liquid carrier comprising a mixture of at least one compound of the formula (III) and at least one compound of the formulas (IIa), (IIb), or mixtures thereof:

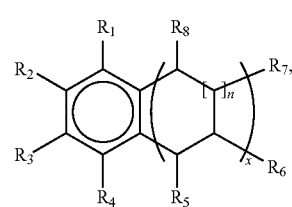

where
each $R_{1-8}$ is independently hydrogen, or a saturated or unsaturated, branched or unbranched, substituted or unsubstituted monovalent $(C_{1-6})$hydrocarbylene;

n is independently selected from −1 to 6 and represents a portion of the fused ring size, x is from 0 to 3, and represents the number of rings fused to the first ring formula (II) comprises formulas (IIa), (IIb), or mixtures thereof:

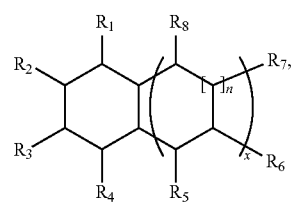

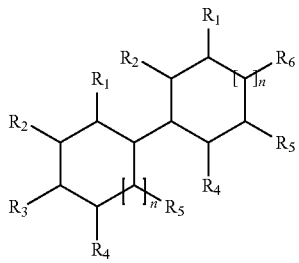

where
each $R_{1-8}$ is independently hydrogen, a saturated or unsaturated, branched or unbranched, substituted or unsubstituted $(C_{3-10})$hydrocarbylene, a cyclic $(C_{3-10})$hydrocarbylene, or a mixture thereof, n and n' is independently selected from −1 to 6 and represents a portion of the ring size, x is from 0 to 3, and represents the number of additional rings fused to the first ring, and if as fused ring has a bridgehead substituent then the isomer comprises cis-, trans-, or mixtures thereof;

about 10 to about 30 vol % a second liquid carrier comprising a compound of the formula (I):

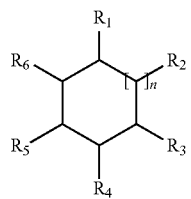

(I)

where each $R_{1-4}$ is independently hydrogen, a saturated or unsaturated, branched or unbranched, substituted or unsubstituted $(C_{1-15})$hydrocarbylene, a carbonyl (C=O), or a mixture thereof, n is independently selected from 0 to 6 and represents a portion of the saturated or unsaturated ring size, and any unspecified hydrogen substituent is selected from cis-, trans-, or mixtures thereof, the second liquid having boiling point less than 160° C.; and an organic semiconducting polymer, wherein the organic semiconducting polymer is a polymer of a fused thiophene.

13. The formulation of claim 12 wherein the first liquid carrier is a mixture of decalin as a mixture of isomers and bi(cyclohexane), the second liquid carrier is cyclohexanone.

* * * * *

UNITED STATES PATENT AND TRADEMARK OFFICE
CERTIFICATE OF CORRECTION

| | | |
|---|---|---|
| PATENT NO. | : 8,916,066 B2 | Page 1 of 1 |
| APPLICATION NO. | : 13/093279 | |
| DATED | : December 23, 2014 | |
| INVENTOR(S) | : Louis Charles Glasgow et al. | |

It is certified that error appears in the above-identified patent and that said Letters Patent is hereby corrected as shown below:

Title Page:

Item 75 Inventors: Louis Charles Glasgow and David N. Schissel should be added as inventors.

Signed and Sealed this
Eleventh Day of August, 2015

Michelle K. Lee
*Director of the United States Patent and Trademark Office*